(12) United States Patent
Zhou et al.

(10) Patent No.: US 7,175,911 B2
(45) Date of Patent: Feb. 13, 2007

(54) TITANIUM DIOXIDE FINE PARTICLES AND METHOD FOR PRODUCING THE SAME, AND METHOD FOR PRODUCING VISIBLE LIGHT ACTIVATABLE PHOTOCATALYST

(75) Inventors: Zhonghua Zhou, Hadano (JP); Fumio Tokuoka, Hadano (JP); Yugo Ito, Machida (JP); Tatsuya Ishii, Machida (JP); Shunzo Shimai, Tougane (JP); Hiroshi Yamaguchi, Kawasaki (JP); Hiroyuki Kondo, Sagamihara (JP)

(73) Assignee: Toshiba Ceramics Co., Ltd., Tokyo (JP)

( * ) Notice: Subject to any disclaimer, the term of this patent is extended or adjusted under 35 U.S.C. 154(b) by 282 days.

(21) Appl. No.: 10/663,769

(22) Filed: Sep. 17, 2003

(65) Prior Publication Data

US 2004/0058149 A1    Mar. 25, 2004

(30) Foreign Application Priority Data

| Sep. 18, 2002 | (JP) | ............................. | 2002-271575 |
| Sep. 18, 2002 | (JP) | ............................. | 2002-271576 |
| Feb. 27, 2003 | (JP) | ............................. | 2003-050677 |
| Feb. 27, 2003 | (JP) | ............................. | 2003-050678 |
| Mar. 25, 2003 | (JP) | ............................. | 2003-081940 |
| Jul. 16, 2003 | (JP) | ............................. | 2003-275369 |
| Jul. 16, 2003 | (JP) | ............................. | 2003-275370 |

(51) Int. Cl.
 *B32B 5/16* (2006.01)
(52) U.S. Cl. ...................... 428/403; 428/702

(58) Field of Classification Search .................. 423/69, 423/81, 610; 428/402, 403, 702; 502/350
See application file for complete search history.

(56) References Cited

U.S. PATENT DOCUMENTS 4,668,501 A    5/1987   Shibuta et al.

(Continued)

FOREIGN PATENT DOCUMENTS

EP    0 870 530 A1    10/1998

(Continued)

OTHER PUBLICATIONS

Nikkei Mechanical, Oct. 2001, pp. 36-39, No. 565. (attached is an English translation of the important passages (1-3)).

(Continued)

*Primary Examiner*—H. Thi Le
(74) *Attorney, Agent, or Firm*—Foley & Lardner LLP (57) ABSTRACT

The invention provides titanium dioxide fine particles, wherein nitrogen and at least one element selected from carbon, hydrogen, sulfur doped in titanium dioxide by heat-treating fine particles of a material of titanium dioxide at 500° C. or more and 600° C. or less in a reducing gas atmosphere containing nitrogen. The titanium fine particles exhibit a high photocatalytic activity than in the conventional art by irradiating a visible light such that they exhibit an isopropanol oxidation activity induced by visible light irradiation with a wavelength of 400 nm or more and 600 nm or less with excellent stability and durability of the photocatalytic activity.

22 Claims, 8 Drawing Sheets

U.S. PATENT DOCUMENTS

| | | | |
|---|---|---|---|
| 6,037,289 A * | 3/2000 | Chopin et al. | 502/2 |
| 6,436,538 B1 * | 8/2002 | Takahashi et al. | 428/403 |
| 6,602,607 B2 * | 8/2003 | Rengakuji et al. | 428/432 |
| 6,627,579 B1 * | 9/2003 | Sakatani et al. | 502/350 |
| 6,743,749 B2 * | 6/2004 | Morikawa et al. | 502/349 |

FOREIGN PATENT DOCUMENTS

| | | |
|---|---|---|
| EP | 0 997 191 A1 | 5/2000 |
| EP | 1 205 244 A1 | 5/2002 |
| JP | 7-187852 A | 7/1995 |
| JP | 2001-072419 A | 3/2001 |
| JP | 2001-190953 A | 7/2001 |
| JP | 2001-207082 A | 7/2001 |
| JP | 2001-212457 A | 8/2001 |
| WO | WO 02/38272 A1 | 5/2002 |

OTHER PUBLICATIONS

R. Asahi et al., "Visible-Light Photocatalysis in Nitrogen-Doped Titanium Oxides", Science, Jul. 13, 2001, pp. 269-271, vol. 293.

Patent Abstracts of Japan, vol. 2000, No. 01, Jan. 31, 2000, JP 11-292537, Oct. 26, 1999.

Patent Abstracts of Japan, vol. 2000, No. 03, Mar. 30, 2000, JP 11-333300, Dec. 7, 1999.

C. Lettmann et al., "Visible light photodegradation of 4-chlorophenol with a coke-containing titanium dioxide photocatalyst", Applied Catalysis B: Environmental, vol. 32, 2001, pp. 215-227.

* cited by examiner

TITANIUM DIOXIDE FINE PARTICLES AND METHOD FOR PRODUCING THE SAME, AND METHOD FOR PRODUCING VISIBLE LIGHT ACTIVATABLE PHOTOCATALYST

BACKGROUND OF THE INVENTION

1. Field of the Invention

The invention relates to titanium dioxide fine particles that can be favorably used for visible light activatable photocatalysts, semiconductors and reflection films for optical communication and a method for producing the fine particles, and a method for producing a visible light activatable photocatalyst. Particularly, the invention relates to titanium dioxide fine particles that are activated by irradiating a visible light and the titanium dioxide fine particles of the invention can be favorably used for paints, textiles, sick house syndrome alleviating agents, harmless treatment agents for industrial effluent and exhaust, and medical materials because of exhibiting functions such as removal of harmful substances by decomposition, deodorization, antibacterial action, decontamination action and anti-clouding action by taking advantage of such photocatalytic activity, and method for producing the same, and method for producing visible light activatable photocatalyst.

2. Description of the Related Art

Electrons and positive holes are formed by photoactivation when a light having an energy exceeding band gaps of a semiconductor is irradiated to semiconductor particles such as titanium dioxide. The electrons and positive holes are transferred to the surface of the semiconductor particles, and evokes various reactions called as photocatalytic reactions by interacting with neighboring ionic species and molecular species.

Since the positive holes generated on the surface of the titanium dioxide particles have particularly strong oxidizing power, many applications of titanium dioxide to paints, textiles, sick house syndrome alleviating agents and harmless treatment agents for industrial effluent and exhaust gas have been proposed, and a part thereof has been practically used.

Hitherto, the titanium dioxide fine particles that have been used for the photocatalyst are crystalline particles of anatase type or rutile type.

Since titanium dioxide of the anatase type or rutile type has a band gap of 3.2 eV (corresponding to a wavelength of 387.5 nm) or 3.0 eV (corresponding to a wavelength of 413.3 nm), respectively, only a UV light having a short wavelength of 387.5 nm or less or 413.3 nm or less is utilized, and visible light has not been utilized at all.

Accordingly, the crystalline titanium dioxide was difficult to function in the applications of interior paints, textiles and sick house syndrome alleviating agents that are used in a room where substantially no UV light exists, and the application of titanium dioxide has been restricted in actuality.

On the contrary, various kinds of titanium dioxide exhibiting catalytic activities by irradiating a visible light have been developed in recent years in order to efficiently utilize sunlight and artificial light.

For example, Japanese Patent No. 3,252,136 discloses titanium dioxide that can exhibit a catalytic activity induced by irradiating a light in a visible region and a method for producing the same, wherein the crystal lattice structure of titanium dioxide of the anatase type is made to be deficient in oxygen by a hydrogen plasma treatment or rare earth element plasma treatment under a reduced pressure, by rare earth element ion injection, or by heating at a high temperature in vacuum.

The titanium dioxide photocatalyst has been reported to respond to visible light by doping nitrogen in titanium dioxide (see "Nikkei Mechanical 2001. 10", No. 565, pp.36–45). For example, Japanese Patent Application Laid-Open (JP-A) Nos. 2001-190953, 2001-207082 and 2001-72419 have disclosed that the titanium dioxide crystal involving oxygen in the crystal exhibits a catalytic activity by irradiating a visible light.

Titanium dioxide doped with nitrogen has a structure comprising doped nitrogen invaded in lattice interstices, or a structure in which oxygen sites in the lattice are substituted with nitrogen.

Such titanium dioxide doped with nitrogen may be synthesized by hydrolyzing titanium chloride in an aqueous ammonia solution, or by heating titanium dioxide in an ammonia gas.

The titanium dioxide photocatalyst is supposed to be activated by a visible light due to oxygen deficient defects or Ti—N bonds in the oxygen deficient or nitrogen doped titanium dioxide.

SUMMARY OF THE INVENTION

However, the oxygen deficient or nitrogen doped titanium dioxide does not always acquire a high photocatalytic activity at a visible light while being poor in stability of the photocatalytic activity.

For example, it is reported that peaks assigned to Ti—N bonds and detected by XPS (X-ray photoelectron spectroscopy) in nitrogen doped titanium dioxide disappear by a heat treatment in air. Therefore, the cause of the technical problems above are supposed to arise from unstable oxygen deficient defects or Ti—N bonds on the surface of the particles in contact with air.

The object of the invention for solving the technical problems above is to provide titanium dioxide fine particles and a method for producing the same, and a method for producing a visible light activatable photocatalyst comprising titanium dioxide, wherein titanium dioxide of the invention exhibits a high catalytic activity by irradiating a visible light while having a photocatalytic activity being excellent in stability and durability.

An aspect of the invention provides titanium dioxide fine particles, wherein at least two members selected from carbon, hydrogen, nitrogen and sulfur doped in titanium dioxide.

The titanium dioxide fine particles constructed as described above exhibit more excellent photocatalytic activity than conventional oxygen deficient or nitrogen doped titanium dioxide, and the photocatalytic activity is excellent in stability and durability.

Another aspect of the invention provides titanium dioxide fine particles, wherein nitrogen, and at least one member selected from carbon, hydrogen and sulfur doped in titanium dioxide.

The titanium dioxide fine particles comprising nitrogen as an essential dopant, and at least one member selected from carbon, hydrogen and sulfur as other dopants can exhibit a more excellent activity.

Preferably, titanium dioxide fine particles in which carbon, hydrogen and nitrogen are doped are suitable among the titanium dioxide fine particles as described above.

Preferably, the concentration of doped nitrogen is 700 ppm by weight or more and 10,000 ppm by weight or less in the titanium dioxide fine particles according to the invention.

Doping more nitrogen tightly binding to titanium dioxide permits an excellent activity at a visible light to be exhibited.

Preferably, doped nitrogen is bonded to titanium of titanium dioxide as Ti—N—O bonds or Ti—N—Ti bonds, and the Ti—N—Ti bonds are preferably the majority of the nitrogen-titanium bonds.

The Ti—N—O bond means that nitrogen is invading in crystal lattice interstices of $TiO_2$ crystals, and the Ti—N—Ti bond means that oxygen in the $TiO_2$ crystal is substituted with nitrogen at the oxygen site in the $TiO_2$ crystal.

Bonding between Ti of titanium dioxide and doped nitrogen becomes stronger by forming the bond as described above, and the titanium dioxide fine particles can exhibit a stable catalytic activity.

Preferably, doped nitrogen is desorbed as $N_2$ by heating the titanium dioxide fine particles to show an $N_2$ desorption peak at a temperature of 700° C. or more.

The presence of the desorption peak in such high temperature region means that doped nitrogen forms a strong bond to titanium dioxide, which is considered as a cause for exhibiting an excellent activity at a visible light.

Preferably, doped hydrogen is desorbed as $H_2$ by heating the titanium dioxide fine particles showing an $H_2$ desorption peak at a temperature of 700° C. or more by the same reason as described above.

Preferably, doped carbon is desorbed as $CO_2$ by heating the titanium dioxide fine particles showing a $CO_2$ desorption peak at a temperature of 700° C. or more.

Preferably, a component having a m/e ratio between the mass number (m) and ionic charge number (e) of 68 is desorbed by heating the fine particles to show a desorption peak at a temperature of the component of 700° C. or more.

Still another aspect of the invention provides titanium dioxide fine particles, wherein two kinds or more of anions including at least nitrogen and carbon doped in titanium dioxide.

The titanium dioxide fine particles constructed as described above also exhibit more excellent photocatalytic activity than the visible light activatable photocatalyst of conventional oxygen deficient or nitrogen doped titanium dioxide, and the photocatalytic activity of titanium dioxide of the invention is excellent in stability and durability.

Preferably, the content of the titanium dioxide component in the fine particles is 80% by weight or more.

The content of the titanium dioxide component as the principal component of the titanium dioxide fine particles is determined considering retention of a high photocatalytic activity.

An excellent activity at a visible light may be exhibited by doping nitrogen and carbon as anions to titanium dioxide as described above.

Preferably, the concentration of doped nitrogen is 700 ppm by weight or more relative to titanium dioxide, and the concentration of doped carbon is 50 ppm by weight or more relative to titanium dioxide.

The concentrations of nitrogen and carbon as dopants are determined considering a high photocatalytic activity, and stability and durability thereof.

Still another aspect of the invention provides titanium dioxide fine particles, wherein mainly titanium dioxide with 700 ppm by weight or more and 10,000 ppm by weight or less of nitrogen anions and carbon anions in a concentration of 1/30 or more and 1/5 or less of the concentration of nitrogen are doped in titanium dioxide.

The titanium dioxide fine particles constructed as described above can also exhibit more excellent photocatalytic activity than the visible light activatable photocatalyst of conventional oxygen deficient or nitrogen doped titanium dioxide, and the photocatalytic activity of titanium dioxide of the invention is excellent in stability and durability.

Preferably, the titanium dioxide fine particles have a particle diameter of 1 µm or less.

The titanium dioxide fine particles of the invention is preferably as fine as above described particles from the viewpoint of ensuring expression of a sufficient photocatalytic activity and good dispensability in solvents.

Preferably, the titanium dioxide fine particles are ellipsoidal spheres with a major axis length of 10 nm or more and 60 nm or less.

The titanium dioxide fine particles exhibiting an excellent activity at a visible light may be obtained by forming primary particles of the fine particles into the shape as described above.

Still another aspect of the invention provides titanium dioxide fine particles exhibiting an IR spectrum with absorption peaks at 340±10 $cm^{-1}$ and 580±50 $cm^{-1}$ measured by Fourier transform IR spectroscopy.

The absorption peaks in the Fourier transform IR absorption spectrum measured by the KBr method are based on doped nitrogen and carbon, which afford an excellent photocatalytic activity by irradiating a visible light.

Preferably, the titanium dioxide fine particles exhibit an isopropanol (IPA) oxidation activity induced by visible light irradiation with a wavelength of 400 nm or more and 600 nm or less.

The titanium oxide fine particles of the invention are proved to have an excellent photocatalytic activity induced by visible light irradiation by exhibiting the isopropanol (IPA) oxidation activity.

Preferably, an acetone gas is formed in a concentration of 500 ppm or more using the titanium dioxide fine particles by the steps comprising: placing 0.2 g of the titanium dioxide fine particles as a sample formed into a uniform 10 cm square layer in a gas bag with a volume of 1 liter; filling an isopropanol gas in the bag by adjusting the initial concentration to 1,500 ppm±150 ppm; and irradiating a light from a UV-shielded fluorescent lamp to the sample at an intensity of 0.5 $mW/cm^2$ at an wavelength of 420 nm for 1 hour.

The titanium dioxide fine particles of the invention are definitely shown to have an excellent photocatalytic activity induced by visible light irradiation by the method for evaluating the photocatalytic activity induced by taking advantage of the isopropanol (IPA) oxidation activity as described above.

Accordingly, the titanium dioxide fine particles of the invention, which exhibits the IPA oxidation activity as described above, can display excellent functions for removing, by decomposition, aldehyde gases such as formaldehyde that is considered to be a cause of sick house syndrome, environmental pollutants such as $NO_x$ in vehicle exhaust gases, and harmful substances to human bodies such as endocrine disruptors including dioxins by irradiating a visible light.

Accordingly, the titanium dioxide fine particles of the invention may be favorably used as the visible light activatable photocatalyst by itself.

Still another aspect of the invention provides a method for producing titanium dioxide fine particles obtained by heat-treating a material of the titanium dioxide fine particles at 500° C. or more and 620° C. or less in a reducing gas atmosphere containing a nitrogen containing gas.

The production method above permits the nitrogen doped titanium dioxide fine particles to be simply and uniformly produced.

Still another aspect of the invention also provides a method for producing titanium dioxide fine particles obtained by heat-treating a material of the titanium dioxide fine particles at 500° C. or more and 620° C. or less in an atmosphere of a nitrogen, carbon and hydrogen containing gas.

Heat-treating in the gas atmosphere as described above permits the titanium dioxide fine particles to be readily obtained by uniformly doping titanium dioxide with nitrogen, carbon and hydrogen.

In the production method above, the material of the titanium dioxide fine particles preferably has an average particle diameter of 10 nm or less and a specific surface area of 300 $m^2$/g or more.

Using a material of the titanium dioxide fine particles as the starting material permits a large quantity of nitrogen to be doped per unit volume, and the surface area of the titanium dioxide fine particles obtained that is responsible for the photocatalytic reaction to be large.

Still another aspect of the invention also provides a method for producing a visible light activatable photocatalyst obtained by heat-treating a molded body, a sintered body or a film of titanium dioxide at 500° C. or more and 620° C. or less in a reducing gas atmosphere containing a nitrogen containing gas.

Heat-treating the molded body, sintered body or film obtained by processing fine particles (a powder) into a prescribed shape as in the fine particle material of titanium dioxide as described above permits the molded body, sintered body or film to be directly used for the visible light activatable catalyst depending on the application.

Still another aspect of the invention provides a method for producing a visible light activatable photocatalyst obtained by heat-treating a molded body, a sintered body or a film of titanium dioxide at 500° C. or more and 620° C. or less in an atmosphere of a nitrogen, carbon and hydrogen containing gas, or in an atmosphere of an $NH_3$ gas and carbon containing gas.

As described above, the titanium dioxide fine particles of the invention may exhibit a higher photocatalytic activity induced by visible light irradiation than conventional visible light activatable photocatalyst, and the photocatalytic activity of the titanium dioxide of the invention is excellent in stability and durability.

The titanium dioxide fine particles of the invention can exhibit functions such as removal of harmful substances by decomposition, deodorizing action, antibacterial action, decontamination action and anti-clouding action by taking advantage of the photocatalytic activity. Therefore, the titanium dioxide fine particles of the invention may be used for various applications such as paints, textiles, sick house syndrome alleviating agent, building materials, interior materials of automobiles, furniture, home electric appliances, house equipment and tableware that are endowed with decontamination action, deodorization action and antibacterial action, as well as for harmless processing agents of industrial effluent and exhaust gases, and for medical materials.

Since the titanium dioxide fine particles of the invention are stable, they may be favorably used as semiconductors. In addition, since the titanium dioxide fine particles of the invention has a different reflective index from the conventional titanium dioxide particles by the doped nitrogen, they can be used as reflection films for optical communication.

According to the production method of the invention, the titanium dioxide fine particles and visible light activatable photocatalyst may be readily and uniformly obtained.

BEST MODE FOR CARRYING OUT THE INVENTION

The invention will be described in more detail with reference to examples.

At least two kinds of members selected from carbon, hydrogen, nitrogen and sulfur are doped in titanium dioxide in the titanium dioxide fine particles of the invention.

The titanium dioxide fine particles doped with two kinds or more of the elements as described above has a different construction from the conventional oxygen deficient or nitrogen doped titanium dioxide, and exhibit a more excellent photocatalytic activity than conventional titanium dioxide. In addition, this titanium dioxide is excellent in stability and durability of photocatalytic activity, and is not so readily deactivated by making contact with air.

The titanium dioxide of the invention also exhibits the same degree of photocatalytic activity by UV light irradiation as the conventional titanium dioxide photocatalyst or more.

A more excellent activity in the visible light can be exhibited in the titanium dioxide fine particles by using nitrogen as an essential dopant while doping at least one kind of the element selected from carbon, hydrogen and sulfur as the other dopants.

Particularly, carbon, hydrogen and nitrogen are preferably doped.

The content of the titanium dioxide component in the fine particles is preferably 80% by weight or more, more preferably 95% by weight or more.

A sufficient photocatalytic activity cannot be obtained when the content of the titanium dioxide component is less than 80% by weight.

Accordingly, composite particles mixed with other inorganic compounds may be used in the range of less than 20% by weight so long as the photocatalytic activity induced by irradiating titanium dioxide with a visible light is not impaired.

Examples of the inorganic compounds mixed with titanium dioxide include silica, alumina, zirconia, magnesia and zinc oxide.

Titanium dioxide usually takes three kinds of crystalline phases of a rutile phase (tetragonal phase), anatase phase (tetragonal phase) and brookite phase (orthorhombic phase), all of which commonly have a structure having edges of a distorted octahedron formed by coordination of six oxygen atoms to the titanium atom. Titanium dioxide of the rutile or anatase type is preferably used as the material of the fine particles, and titanium dioxide of the anatase type is particularly preferable from the viewpoint of expression of photocatalytic activity.

It is also preferable that the titanium dioxide fine particles obtained by doping the titanium dioxide with at least two kinds of elements selected from carbon, hydrogen, nitrogen and sulfur are also the anatase type.

Titanium dioxide of the invention may be obtained by doping at least two kinds of the elements selected from carbon, hydrogen, nitrogen and sulfur into fine particles of a material mainly comprising titanium oxide. Nitrogen is preferably the essential element among the dopants above.

The concentration of nitrogen as the dopant is preferably 700 ppm by weight or more and 10,000 ppm by weight or less. The concentration is more preferably 1,500 ppm by weight or more and 5,000 ppm by weight or less, further preferably 2,000 ppm by weight or more, and particularly preferably 2,500 ppm by weight or more.

A sufficient photocatalytic activity cannot be obtained by irradiating a visible light when the concentration of nitrogen is less than 700 ppm by weight. Particularly, raising of the initial activity becomes slow with a small rising slope. Therefore, attaining the object of the photocatalyst may be difficult depending on the intensity of the visible light, application of the catalyst or the like.

When the concentration of nitrogen exceeds 10,000 ppm by weight, it takes so many of manufacturing time and labor that the composition cannot be considered to be practical.

The preferable concentrations of respective dopants other than nitrogen are about 50 to 1,500 ppm by weight for carbon and sulfur, and about 1 to 50 ppm by weight for hydrogen. It is particularly preferable that the concentration of carbon is 100 ppm by weight or more, and the concentration of sulfur is also 100 ppm by weight or more.

The method for doping the dopants is not particularly restricted. A heat diffusion method, laser doping method, plasma doping method and ion injection method that are usually used for these dopants may be employed without any problem.

Practically, accelerated ions from a nitrogen anion source and carbon anion source are doped into a titanium dioxide target using the ion injection apparatus.

For doping nitrogen and carbon, liquidous titanium halide such as titanium chloride ($TiCl_4$) is hydrolyzed in a solution containing cyan (HCN), cyanic acid or isocyanic acid (HOCN), lower amines ($RNH_2$, $R_2NH$, $R_3N$), or azo or diazo compounds or a solution containing these compounds and ammonia ($NH_3$). Alternatively, fine particles of the titanium dioxide material are heat-treated (annealed) in an inert gas stream such as nitrogen or argon containing cyan, cyanic acid or isocyanic acid, or lower amine, or containing these compounds and ammonia, or in a mixed gas stream of various hydrocarbons and ammonia.

The dopants may be doped by decomposition of respective compounds. The dopants may be doped simultaneously or one after another, and may be doped at the same time for forming the particles, or after forming the particles according to the modes.

Conventional oxygen deficient titanium dioxide is represented by a chemical formula of $TiO_{2-x}$.

On the other hand, the titanium dioxide according to the invention is represented by a chemical formula of $TiO_{2-x}N_xN_yA$. $N_x$ represents nitrogen invading into the oxygen site of the titanium dioxide crystal, $N_y$ represents nitrogen invading into crystal lattice interstices of the titanium dioxide crystal, and A represents carbon, sulfur or hydrogen doped into the titanium dioxide crystal.

The structure of titanium dioxide above is considered to permits a high photocatalytic activity induced by visible light irradiation to be exhibited.

When nitrogen is doped in the invention, it is preferably involved in the lattice interstices of the $TiO_2$ crystal, or bonded to Ti in titanium dioxide as a Ti—N—O bond. Alternatively, oxygen in the $TiO_2$ crystal is preferably substituted with nitrogen, and the doped nitrogen replaces the oxygen site in the $TiO_2$ crystal. In other words, nitrogen is preferably bonded to Ti in titanium dioxide as a Ti—N—Ti bond.

Preferably, the Ti—N—Ti bond is the majority of these bonds.

Figure 1:
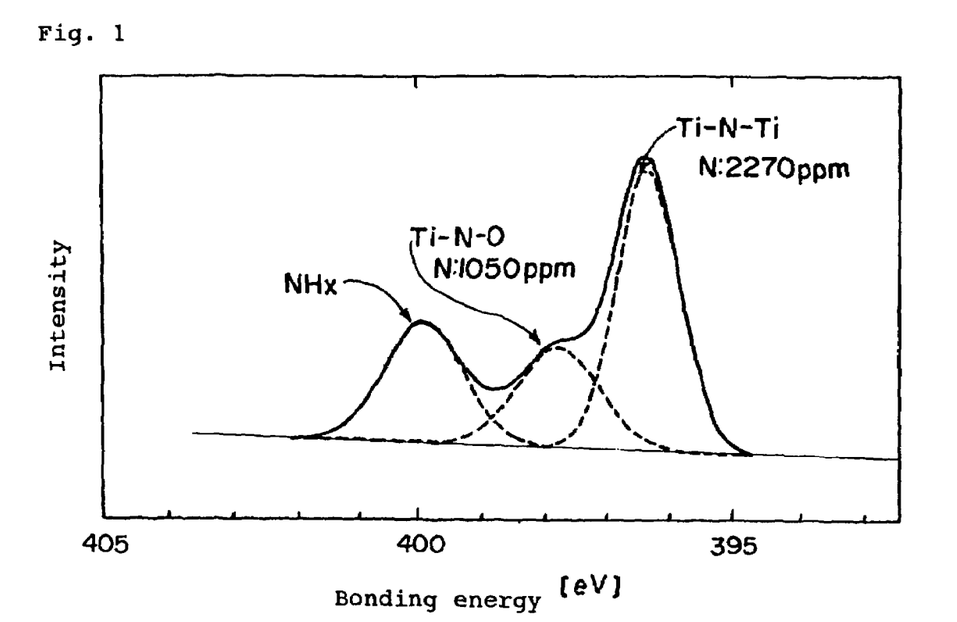
FIG. 1 shows the result of XSP analysis on bonding of doped nitrogen with respect to the titanium dioxide fine particles according to the invention.
Figure 2:
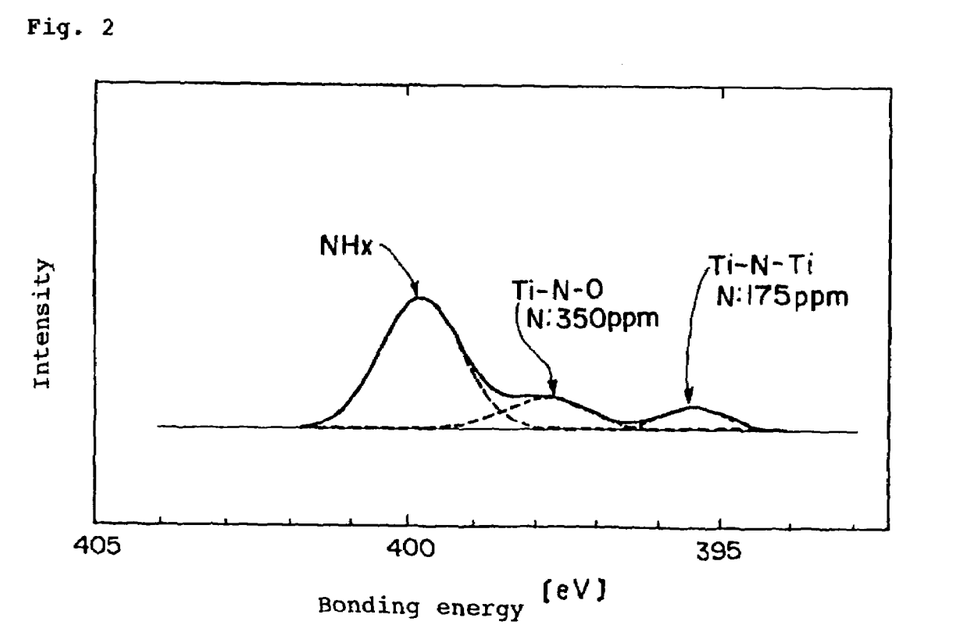
FIG. 2 shows the result of XSP analysis on bonding of doped nitrogen with respect to the conventional titanium dioxide fine particles.
Figure 3:
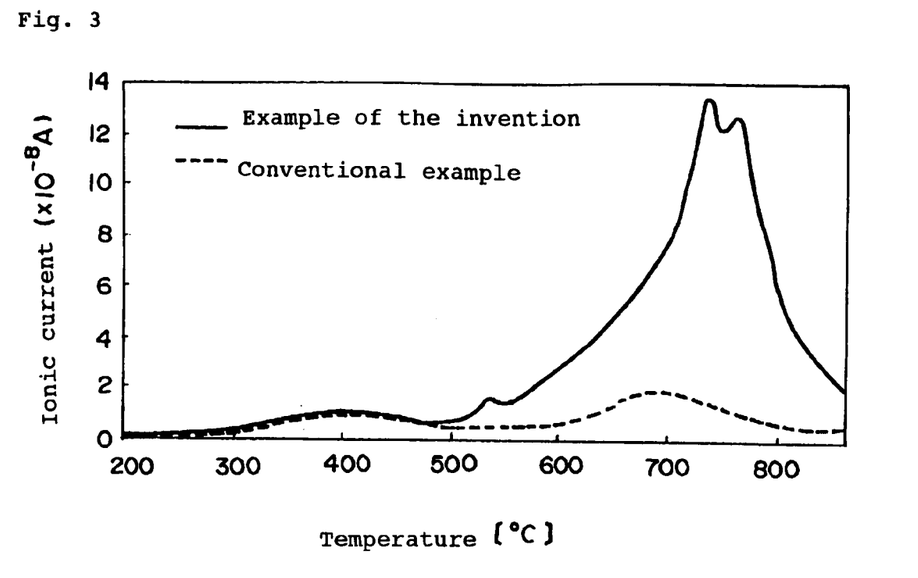
FIG. 3 shows an $N_2$ desorption spectrum by a temperature programmed desorption (TPD) method of the titanium dioxide fine particles according to the invention.
Figure 4:
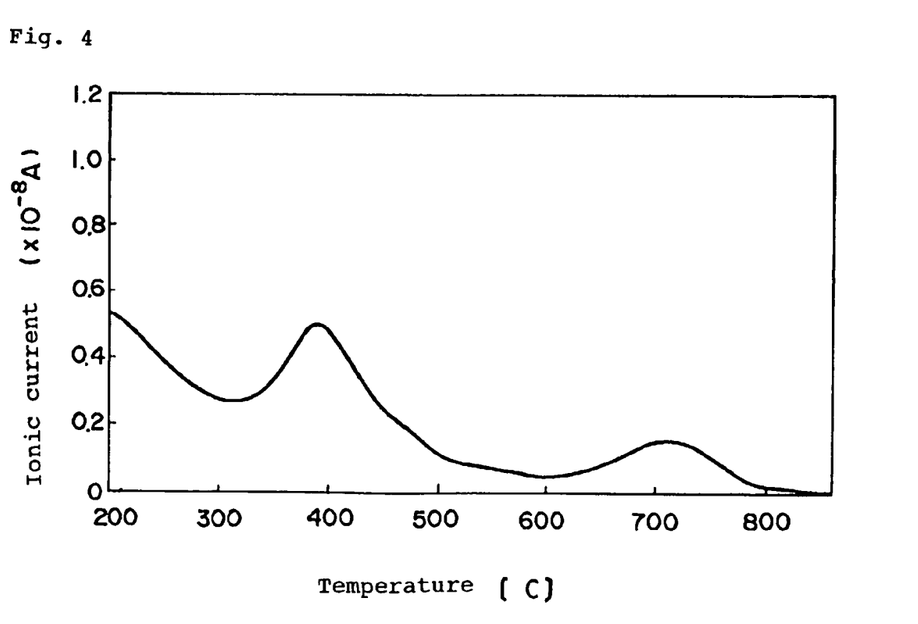
FIG. 4 shows an $H_2$ desorption spectrum by a temperature programmed desorption (TPD) method of the titanium dioxide fine particles according to the invention.
Figure 5:
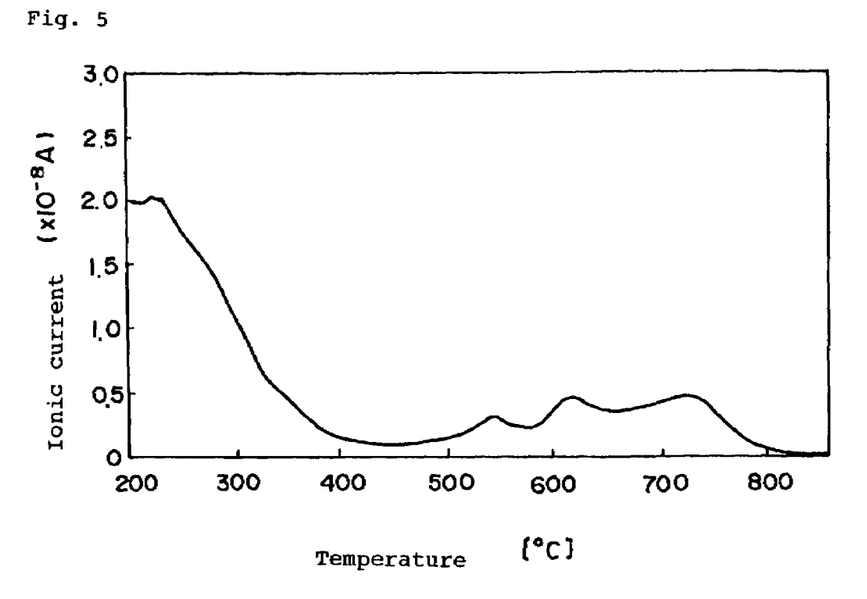
FIG. 5 shows a $CO_2$ desorption spectrum by a temperature programmed desorption (TPD) method of the titanium dioxide fine particles according to the invention.

FIGS. 1 and 2 show the analytical results of bonding of doped nitrogen in the titanium dioxide fine particles. These results were obtained by an XPS analysis of the fine particles after etching by sputtering argon ions. FIG. 1 shows the result in the example of the invention, and FIG. 2 shows the conventional nitrogen doped titanium dioxide fine particles.

The measuring conditions of the XPS analysis are as follows:

Apparatus: AXIS-Ultra manufactured by Kratos Co.

Excited X-ray source: monochromatic Al—Kα line (1486.6 eV)

Photoelectron detection angle: 90° (from the surface of the sample)

Detection depth: <10 nm

Charged neutralization gun: used (irradiates slow electrons)

In FIGS. 1 and 2, the peak at the right side represents the concentration of nitrogen in the Ti—N—Ti bond. The peak at the center represents the concentration of nitrogen in the Ti—N—O bond.

The peak at the left side represents the concentration of nitrogen adsorbed on the surface of the titanium dioxide fine particles as $NH_x$, and nitrogen is not tightly bonded to Ti.

FIGS. 1 and 2 clearly show that many Ti—N—Ti bonds in which oxygen in titanium dioxide is substituted with nitrogen were detected in the invention, and the proportion of the Ti—N—O bond representing nitrogen invaded into the interstices of the Ti—O bond is larger than in conventional titanium dioxide.

Since the titanium dioxide fine particles of the invention have bonds such as described above, doped nitrogen is tightly bonded to Ti in titanium dioxide, and serves for exhibiting a stable catalytic function when titanium dioxide is used as the visible light activatable photocatalyst.

Desorption gas spectra of the titanium dioxide fine particles of the invention measured by the temperature programmed desorption (TPD) method are shown in FIGS. 3 to 6. FIGS. 3, 4, 5 and 6 show the desorption gas of $N_2$, $H_2$, $CO_2$ and the component with m/e=68, respectively.

The TPD measuring conditions are as follows:
Equipment: temperature programmed desorption gas analyzer (TPD; Model: Thermo Plus TPD type V)
Sample: a powder sample is filled in a platinum cell (diameter 6 mm, height 2.5 mm)
Measuring temperature range: 40 to 900° C.
Heating rate: 10° C./min
Measuring mode TIC (scanning): m/e=1 to 100
Vacuum degree at the start of measurement: $\leq 2.0 \times 10^{-6}$ Pa As shown in FIGS. 3 to 6, desorption peaks are observed at 700° C. or more in all of $N_2$, $H_2$, $CO_2$ and the component with m/e=68.

The desorption peaks observed at high temperature regions of 700° C. or more is supposed to be ascribed to desorption of nitrogen, hydrogen and carbon forming a part of the structure of the titanium dioxide fine particles of the invention.

The results above mean that doped nitrogen, hydrogen and carbon more tightly form chemical binds with titanium dioxide.

While peaks are observed at a low temperature region of less than 700° C., these peaks are assigned to desorption of gases such as $NH_3$ and $H_2O$ adsorbed on the surface of the titanium dioxide fine particles, and are not due to nitrogen, hydrogen and carbon that are responsible for forming the substantial particle structure.

Figure 6:
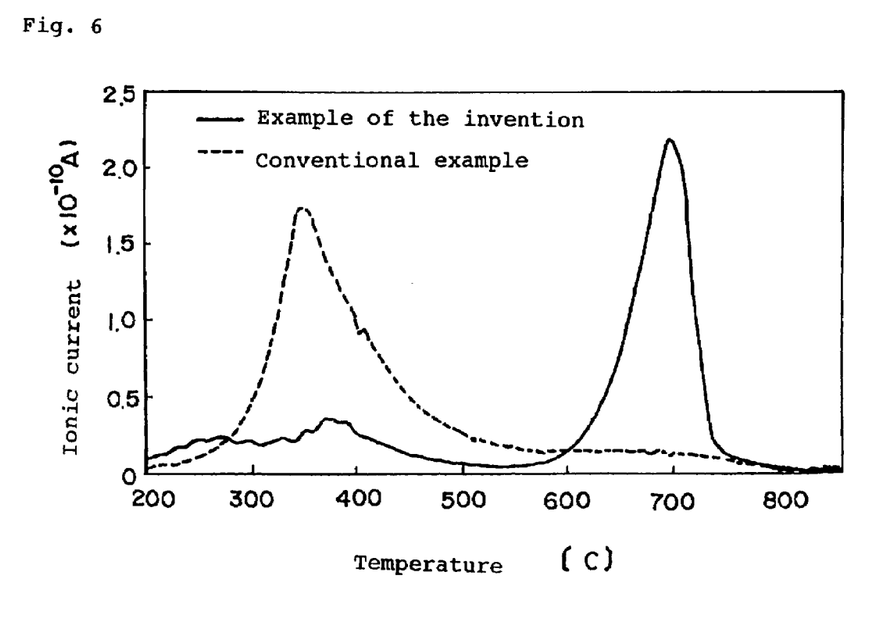
FIG. 6 shows a desorption spectrum of a component having a m/e ratio between the mass number (m) and ionic charge number (e) of 68 by a temperature programmed desorption (TPD) method of the titanium dioxide fine particles according to the invention.

Although FIG. 6 shows the spectra of the component with m/e=68, the actual name of the substance has not been made clear yet.

However, the desorption peak temperature of the substance is 700° C. or more in the invention as is evident from FIG. 6, although the temperature is about 370° C. in the conventional (nitrogen doped) visible light activatable photocatalyst fine particles.

Accordingly, the component with m/e=68 is tightly bonded to titanium dioxide in the invention, which is considered to be a factor for exhibiting an excellent activity induced by visible light irradiation.

In another aspect of the invention provides particles mainly comprising titanium dioxide in which two or more kinds of anions including at least nitrogen and carbon are doped.

Titanium dioxide in which two or more kinds of anions including at least nitrogen and carbon are doped has a different construction from the construction of conventional oxygen deficient or nitrogen doped titanium dioxide, and exhibits more excellent photocatalytic activity than the conventional visible light activatable photocatalyst. Moreover, the photocatalytic activity is excellent in stability and durability, and the catalyst is not deactivated so easily even by contacting with air.

The titanium dioxide of the invention exhibits a performance comparable or superior to the conventional titanium dioxide photocatalyst by irradiation of a UV light.

The content of the titanium dioxide component in the fine particles is preferably 80% by weight or more, more preferably 95% by weight or more.

A sufficient photocatalytic activity cannot be obtained when the content of the titanium dioxide component is less than 80% by weight.

Accordingly, composite particles mixed with other inorganic compounds may be used in the range of less than 20% by weight, so long as the photocatalytic activity induced by visible light irradiation to titanium dioxide is not impaired.

Examples of the inorganic compound mixed with titanium dioxide include silica, alumina, zirconia, magnesia and zinc oxide.

Titanium dioxide of the rutile type or anatase type is preferably used as the fine particles of the material from the viewpoint of allowing the photocatalytic activity to be expressed, and titanium dioxide of the anatase type is particularly preferable.

Particularly, titanium dioxide is desired to be the anatase type even after doping two or more kinds of anions containing nitrogen and carbon.

The titanium dioxide fine particles are obtained in the invention by doping two or more kinds of anions containing at least nitrogen and carbon in the fine particles of the material mainly comprising titanium dioxide.

The concentrations of the dopants are preferably 700 ppm by weight or more and 50 ppm by weight or more with respect to nitrogen and carbon, respectively, relative to titanium dioxide. More preferably, the concentration of nitrogen is 1,500 ppm by weight or more and 5,000 ppm by weight or less, and the concentration of carbon is 50 ppm by weight or more and 1,500 ppm by weight or less.

When the concentrations of nitrogen and carbon are less than 700 ppm by weight and less than 50 ppm by weight, respectively, a sufficient photocatalytic activity induced by visible light irradiation cannot be obtained. Particularly, raising of the initial activity becomes slow with a small rising slope. Therefore, attaining the object of the photocatalyst may be difficult depending on the intensity of the visible light and application of the catalyst.

A third anion or additional anions may be doped in the above mentioned anion doping process other than the nitrogen anion as an essential anion and carbon anion.

While the kinds of the doped anions are not particularly restricted, examples of them include sulfur (S), selenium (Se), phosphorous (P), arsenic (As), silicon (Si), boron (B), fluorine (F), chlorine (Cl) and bromine (Br) anions.

The method for doping the dopants is not particularly restricted. A heat diffusion method, laser doping method, plasma doping method and ion injection method that are usually used for these dopants may be employed without any problem.

Practically, accelerated ions from a nitrogen anion source and carbon anion source are doped into a titanium dioxide target using the ion injection apparatus. Liquidous titanium halide such as titanium chloride ($TiCl_4$) may be hydrolyzed in a solution containing cyan (HCN), cyanic acid or isocyanic acid (HOCN), lower amines ($RNH_2$, $R_2NH$, $R_3N$), or azo or diazo compounds or a solution containing these compounds and ammonia ($NH_3$). Alternatively, fine particles of the titanium dioxide material are heat-treated (annealed) in an inert gas stream such as nitrogen or argon containing cyan, cyanic acid or isocyanic acid, or lower amine, or containing these compounds and ammonia, or in a mixed gas stream of various hydrocarbons and ammonia.

The nitrogen anion and the carbon anion may be doped by decomposition of respective compounds. The dopants may be doped simultaneously or one after another, and may be doped at the same time for forming the particles, or after forming the particles according to the modes.

Particularly, 700 ppm by weight or more and 10,000 ppm by weight or less of nitrogen anions, and carbon anions in a concentration of 1/30 or more and 1/3 or less of the concentration of nitrogen are doped in the titanium dioxide fine particles.

The concentration of nitrogen as a dopant is preferably 700 ppm by weight or more and 10,000 ppm by weight or less, more preferably 1,500 ppm by weight or more and 5,000 ppm by weight or less.

When the concentration of nitrogen is less than 700 ppm by weight, a sufficient photocatalytic activity induced by visible light irradiation cannot be obtained. Particularly, raising of the initial activity becomes slow with a small rising slope. Therefore, attaining the object of the photocatalyst may be difficult depending on the intensity of the visible light and application of the catalyst.

The concentration of carbon is preferably 1/30 or more and 1/3 or less of the concentration of nitrogen doped in titanium dioxide from the viewpoint of obtaining a sufficient activity induced by visible light irradiation.

The particle diameter of the titanium dioxide fine particles (primary particles) of the invention is preferably 1 µm or less, more preferably 0.01 µm or more and 1 µm or less from the viewpoint of obtaining a sufficient activity induced by photocatalyst and good dispersability in solvents.

The titanium dioxide fine particles having the particle diameter in the above range may be favorably used for paints.

The titanium dioxide fine particles of the invention exhibiting an excellent activity induced by visible light irradiation may be favorably obtained as ellipsoidal spheres having a major axis length of 10 nm or more and 60 nm or less, more preferably with a major axis length of 30 to 40 nm.

The ratio of the minor axis length to the major axis length of the primary article is preferably 1:2 to 1:4.

The titanium dioxide fine particles of the invention has an IR spectrum with absorption peaks at wave numbers of $340\pm10$ cm$^{-1}$ and $580\pm50$ cm$^{-1}$ measured by Fourier transform IR spectroscopy.

The absorption peaks observed at near the wave numbers of 340 cm$^{-1}$ and 580 cm$^{-1}$ in the Fourier transform IR (FT-IR) spectroscopy measured by the KBr method show that nitrogen and carbon are doped.

The Ti—N bond in the titanium dioxide fine particles of the invention is stabilized by doped nitrogen and carbon, and a large photocatalyst effect may be displayed by irradiating a visible light.

The titanium dioxide fine particles of the invention exhibit an oxidation activity to formaldehyde and isopropanol (IPA) by irradiating a visible light.

Preferably, an acetone gas is formed in a concentration of 500 ppm or more using the titanium dioxide fine particles by the steps comprising: placing 0.2 g of the titanium dioxide fine particles as a sample formed into a uniform 10 cm square layer in a gas bag with a volume of 1 liter; filling an isopropanol gas in the bag by adjusting the initial concentration to 1,500 ppm±150 ppm; and irradiating a light from a UV-shielded fluorescent lamp to the sample at an intensity of 0.5 mW/cm$^2$ at an wavelength of 420 nm for 1 hour.

Acetone is formed by oxidation of IPA, and is converted into carbon dioxide and water by allowing the oxidation reaction to be further proceeded. The IPA oxidation reaction is used as one of the standard method for evaluating the photocatalytic activity.

While the photocatalyst performance evaluation test method IIb (gas-bag method B) by The Conference on Photocatalytic Product Technology is used as the evaluation method of the photocatalytic activity of titanium dioxide, the gas-bag method B evaluates the photocatalytic activity induced by UV irradiation.

On the contrary, the unique evaluation method as described above is employed for evaluating the photocatalytic activity induced by visible light irradiation in the invention. The excellent photocatalytic activity of the titanium dioxide fine particles of the invention by irradiation of a visible light may be clearly shown by this method.

An example of the method for evaluating the photocatalytic activity of the titanium dioxide fine particles of the invention will be described in detail hereinafter.

The titanium dioxide fine particles (0.2 g) are dispersed in water, coated on a quartz glass plate with an area of 10 cm×10 cm, and the quartz plate is dried at 50° C. overnight to prepare a test sample.

Then, after placing the test sample in a Teddler bag with a volume of 1 liter, air containing isopropanol (IPA) vapor is circulated in the Teddler bag for 1 hour to saturate the titanium dioxide fine particles with the adsorbed gas.

The concentrations of the IPA gas and acetone gas in the Teddler bag are measured by gas chromatography in order to adjust the concentrations of the IPA gas and acetone gas to 1,500 ppm±150 ppm and 0 ppm, respectively. This state is defined to be a state before irradiation of a visible light (original state).

The Teddler bag is irradiated with a light at an wavelength of 420 nm with an intensity of 0.5 mW/cm$^2$ using a fluorescent lamp covered with a UV cut film that is impermeable to a light with an wavelength of 410 nm or less. Then, the concentration of the IPA gas, and the concentration of the acetone gas formed by oxidation of IPA are measured.

The titanium dioxide fine particles of the invention is preferably able to form the acetone gas at a concentration of 500 ppm or more, in order to clearly show that titanium dioxide of the invention is a photocatalyst that exhibits an excellent activity induced by visible light irradiation.

The IPA oxidation accelerating function by visible light irradiation described above, namely an IPA oxidation activity, means that titanium dioxide of the invention possesses an ability for removing, by decomposition, harmful substances to human bodies such as aldehyde gases including formaldehyde that is considered to cause sick house syndrome, environmental pollutants such as $No_x$ in automobile exhaust gases, and endocrine disruptors such as dioxins, and that titanium oxide of the invention can exhibit an excellent function as a visible light activatable photocatalyst.

Accordingly, the titanium dioxide fine particles of the invention may be favorably used as the visible light activatable photocatalyst.

The titanium dioxide fine particles of the invention are obtained by heat-treating fine particles of the titanium dioxide material at 500° C. or more and 620° C. or less in a reducing gas atmosphere containing a nitrogen containing gas.

The nitrogen doped titanium dioxide fine particles that exhibit an excellent photocatalytic activity induced by visible light irradiation may be readily and uniformly produced by the production method as described above.

The primary particles of the fine particles of the titanium dioxide material preferably has an average particle diameter of as small as 10 nm or less, and a specific surface area of 300 m²/g or more.

A large quantity of nitrogen may be doped per unit area by using the fine particles of the titanium dioxide material having such large surface area, while permitting the surface area that is responsible for the photocatalytic reaction of the resultant titanium dioxide fine particles to be larger.

In the method for producing the visible light activatable photocatalyst of the invention, a molded body, sintered body or film of titanium dioxide is heat-treated at 500° C. or more and 620° C. or less in a reducing gas atmosphere containing a nitrogen containing gas.

A molded body, sintered body or film may be directly used as a photocatalyst depending on various uses, by heat-treating the molded body obtained by molding fine particles (powder) into a prescribed shape, the sintered body prepared by sintering the molded body, and the film deposited by CVD in the same manner of the case of the fine particle of the titanium dioxide material.

For example, titanium dioxide of the invention may be readily utilized for cleaning harmful substances in the room and deodorizing of air from an air conditioner, by previously molding the particles into the shape of building and interior materials such as ornaments, fluorescent lamp shades, tiles, pipes and panels.

The molded body, sintered body and film of the invention are preferably porous materials. Since the specific surface area of the photocatalyst becomes larger when the material is porous, the light can be readily invaded into the inside of the material.

While such porous material may be formed by various methods using conventional methods, the material is preferably produced by foaming with stirring as described in JP-A No. 07-187852. Pores may be readily controlled by this production method using the foaming method by stirring, which is a more favorable and relatively simple production method.

The heat treatment temperature in the method for producing the titanium dioxide fine particles or visible light activatable photocatalyst is preferably 500° C. or more and 620° C. or less.

A sufficient photocatalytic activity by visible light irradiation cannot be obtained when the titanium dioxide fine particles are heat-treated at a temperature less than 500° C. or exceeding 620° C.

The heat treatment temperature is more preferably 530° C. or more and 590° C. or less.

The titanium dioxide fine particles are heat-treated in a reducing gas atmosphere containing a nitrogen containing gas, in order to allow nitrogen to be doped in titanium dioxide.

The nitrogen containing gas available include $N_2$, $NH_3$, NO and $NO_2$ gases.

A mixing gas of the nitrogen containing gas and $H_2$ and the like may be used for the reducing gas atmosphere.

The titanium dioxide fine particles may be heat-treated in a gas atmosphere containing nitrogen, carbon and hydrogen, or in a gas atmosphere containing $NH_3$ gas and carbon in order to allow carbon and hydrogen to be doped in titanium dioxide.

While examples of the carbon containing gas include hydrocarbon gases such as methane, ethane, propane and butane that contain hydrogen as well as carbon monoxide and carbon dioxide, the hydrocarbon gases are favorably used.

One kind of gas may be used, or a plurality of gases may be mixed for the gas atmosphere as described above. An inert gas may be mixed in the gas.

When a mixed gas of $NH_3$ gas and a hydrocarbon gas is used, the content of the hydrocarbon gas is preferably smaller than the content of $NH_3$ gas. Preferably, the content of the hydrocarbon gas is 2 to 70%, more preferably 5 to 50%, relative to the $NH_3$ gas.

EXAMPLES

While the invention is described in detail with reference to examples, the invention is by no means restricted to these examples.

(Evaluation Test of Activity Induced by Visible Light Irradiation)

The photocatalytic activity induced by visible light irradiation was evaluated as follows in the examples and comparative examples.

The titanium dioxide fine particles (0.2 g) as the test object were dispersed in water, and the aqueous dispersion was coated on a quartz glass plate with an area of 10 cm×10 cm, followed by drying at 50° C. overnight to prepare a test sample.

Then, the test sample was placed in a Teddler bag with a volume of 1 liter, and air containing isopropanol (IPA) vapor was circulated in the Teddler bag for 1 hour to saturate the titanium dioxide fine particles with adsorbed gas to prepare a test gas.

The test gas was found to contain 1,500 ppm of IPA, and no acetone gas was detected (ND), by a measurement of IPA and acetone in this test gas by gas chromatography (Shimadzu GC-8A, Column: Shimadzu packed column SBS-100). This state was defined to be the sate before irradiation of a visible light (original state).

The Teddler bag was irradiated with a light at an wavelength of 420 nm with an intensity of 0.5 mW/cm² for 5 hours using a fluorescent lamp (Toshiba FLR 20S, W/M) covered with a UV cut film (UV Guard UGP 20WL10 manufactured by Fuji Photo Film Co., Ltd.) that is impermeable to a light with an wavelength of 410 nm or less. Then, the concentration of the IPA gas, and the concentration of the acetone gas formed by oxidation of IPA were measured for every 30 minutes after the start of irradiation.

The result of these measurements is summarized in Table 1.

Example 1

Titanium dioxide fine particles (primary particles of ellipsoidal sphere with a minor axis length of about 10 nm and major axis length of about 30 nm) of the anatase type doped with 3,000 ppm by weight of nitrogen and 150 ppm by weight of carbon were synthesized.

The photocatalytic activity induced by visible light irradiation was evaluated with respect to the titanium dioxide fine particles.

The titanium dioxide fine particles showed the characteristics of the invention as shown in FIGS. 1 and 3 to 6.

Example 2

Titanium dioxide fine particles (primary particles of ellipsoidal sphere with a minor axis length of about 10 nm and major axis length of about 30 nm) doped with 3,000 ppm by weight of nitrogen and 75 ppm by weight of carbon were synthesized.

The photocatalytic activity induced by visible light irradiation was evaluated with respect to the titanium dioxide fine particles.

Example 3

Titanium dioxide fine particles (primary particles of ellipsoidal sphere with a minor axis length of about 10 nm and major axis length of about 30 nm) doped with 3,000 ppm by weight of nitrogen and 7.5 ppm by weight of carbon were synthesized.

The photocatalytic activity induced by visible light irradiation was evaluated with respect to the titanium dioxide fine particles.

Comparative Example 1

Titanium dioxide fine particles (primary particle diameter of 5 to 30 nm) doped with 3,000 ppm by weight of nitrogen were synthesized.

The photocatalytic activity induced by visible light irradiation was evaluated with respect to the titanium dioxide fine particles.

Comparative Example 2

The photocatalytic activity induced by visible light irradiation was evaluated with respect to commercially available oxygen deficient titanium dioxide fine particles (manufactured by A Company).

Comparative Example 3

The photocatalytic activity induced by visible light irradiation was evaluated with respect to conventional nitrogen doped titanium dioxide fine particles (primary particle diameter of 5 to 10 nm, manufactured by B Company).

The results in Table 1 shows that the acetone gas formed by an oxidation reaction of IPA was detected by irradiation of a visible light when the titanium dioxide fine particles doped with two kinds of elements of nitrogen and carbon are used (Examples 1 to 3), and the titanium dioxide fine particles was confirmed to exhibit a photocatalytic activity induced by visible light irradiation.

The titanium dioxide fine particles in Examples 1 to 3 showed further excellent photocatalytic activity in the same irradiation time as compared with the titanium dioxide fine particles in which only nitrogen is doped (Comparable Example 1), or oxygen deficient commercially available titanium dioxide fine particles (Comparative Example 2). In particular, the result in Example 1 showed twice or more of IPA oxidation activity as compared with the results in Comparative Examples 1 and 2.

The titanium dioxide fine particles in Examples 2 and 3, and in Comparative Example 3 were baked on the quartz glass plates, respectively, at 180° C. for 1 hour, and the samples were subjected to the activity evaluation tests induced by a visible light irradiation. The results showed that, while an IPA decomposition effect of about 75% was observed in Examples 2 and 3, the IPA decomposition effect was decreased to about 50% in Comparative Example 3.

It was confirmed from these results that the titanium dioxide fine particles in Examples 2 and 3 are superior to the titanium dioxide fine particles in Comparative Example 3 with respect to the photocatalytic activity induced by irradiating a visible light even by applying a high temperature treatment.

No changes were observe in the titanium dioxide fine particles in Examples 2 and 3 and in Comparative Example 3 in a dark state with no irradiation of the light.

(FT-IR Measurement)

Fourier transform IR (FT-IR) absorption spectra by the KBr method were measured with respect to the titanium dioxide fine particles in the Example 1 and the Comparative Examples 3.

The apparatus use was Fourier transform IR spectrophotometers IFS 113V manufactured by Bruker Co. and 260-50 manufactured by Hitachi, Ltd., and the resolution used for the measurement was 4 $cm^{-1}$.

The measuring sample was mixed with KBr in a mortar and granulated into a powder, which was molded into a pellet by a tablet molding device for the measurement.

Figure 12:
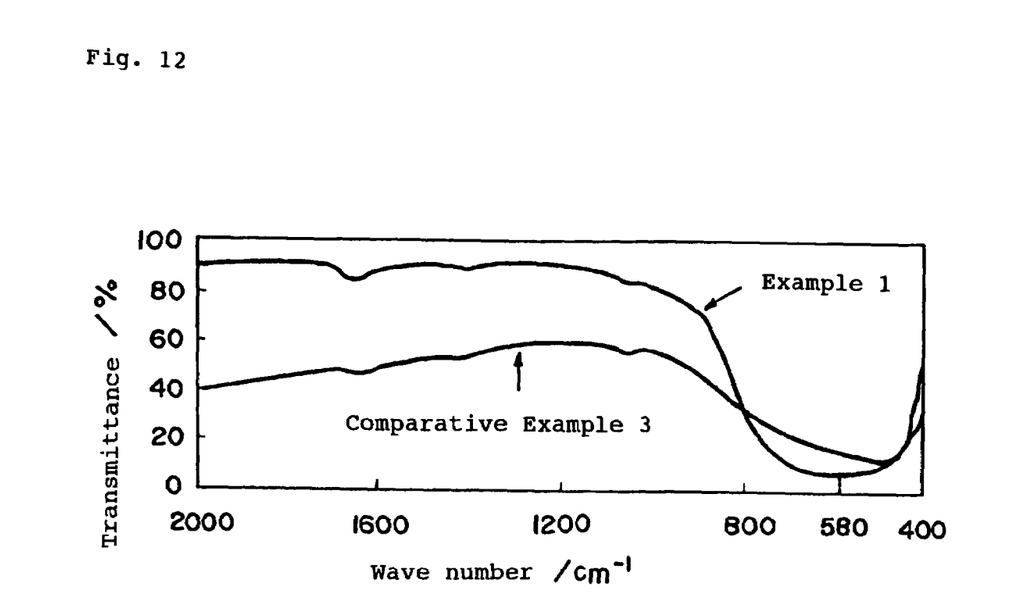
FIG. 12 shows IR absorption spectra of the titanium dioxide fine particles in Example 1 and Comparative Example 3.
Figure 13:
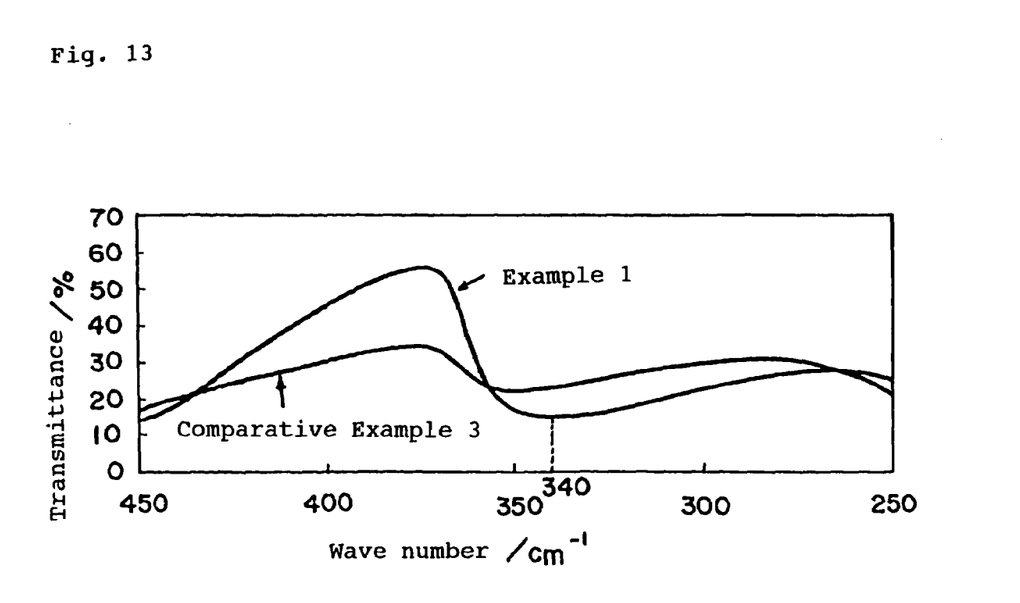
FIG. 13 shows IR absorption spectra of the titanium dioxide fine particles in Example 1 and Comparative Example 3.

The measured spectra are shown in FIGS. 12 and 13.

As shown in the results of measurements of FT-IR in FIGS. 12 and 13, absorption peaks were observed at wave numbers of 580 $cm^{-1}$ and 340 $cm^{-1}$ in Example 1, and the

TABLE 1

| | | Irradiation time | Before irradiation | 30 minutes | 60 minutes | 90 minutes | 300 minutes |
|---|---|---|---|---|---|---|---|
| Example | 1 | IPA (ppm) | 1500 | 1350 | 1100 | 800 | 0 |
| | | Acetone (ppm) | ND | 350 | 880 | 1300 | 3300 |
| | 2 | IPA (ppm) | 1500 | 1400 | 1200 | 1000 | 150 |
| | | Acetone (ppm) | ND | 120 | 310 | 550 | 1900 |
| | 3 | IPA (ppm) | 1500 | 1400 | 1300 | 1100 | 350 |
| | | Acetone (ppm) | ND | ND | 260 | 430 | 1600 |
| Comparative Example | 1 | IPA (ppm) | 1500 | 1400 | 1300 | 1150 | 400 |
| | | Acetone (ppm) | ND | ND | 250 | 400 | 1500 |
| | 2 | IPA (ppm) | 1500 | 1460 | 1380 | 1200 | 528 |
| | | Acetone (ppm) | ND | ND | 190 | 300 | 1300 |
| | 3 | IPA (ppm) | 1500 | 1380 | 1280 | 1130 | 150 |
| | | Acetone (ppm) | ND | 150 | 420 | 630 | 2000 | peak positions are different from those in Comparative Example 3 in which only nitrogen was doped.

The absorption peaks are assigned to doped carbon and nitrogen, which are characteristic in the titanium dioxide fine particles of the invention.

(Evaluation of Aldehyde Decomposition Ability)

The titanium dioxide fine particles in Example 1 and Comparative Example 2 were dispersed in water (solid fraction 5%), and the dispersed aqueous solutions were coated on a sliding-screen paper sheet of 27 cm×90 cm, followed by drying in room temperature to prepare test samples.

Each of the test samples was placed in a SUS box with a volume of 1 m$^3$, and formaldehyde was introduced in a concentration of 1.5 ppm. Each test sample was set at a distance of 10 cm from a fluorescent lamp (Toshiba FLR 20W, W/M).

The formaldehyde gas concentration during irradiation by the fluorescent lamp was measured with a multi-gas monitor (Innova type 1312).

Figure 14:
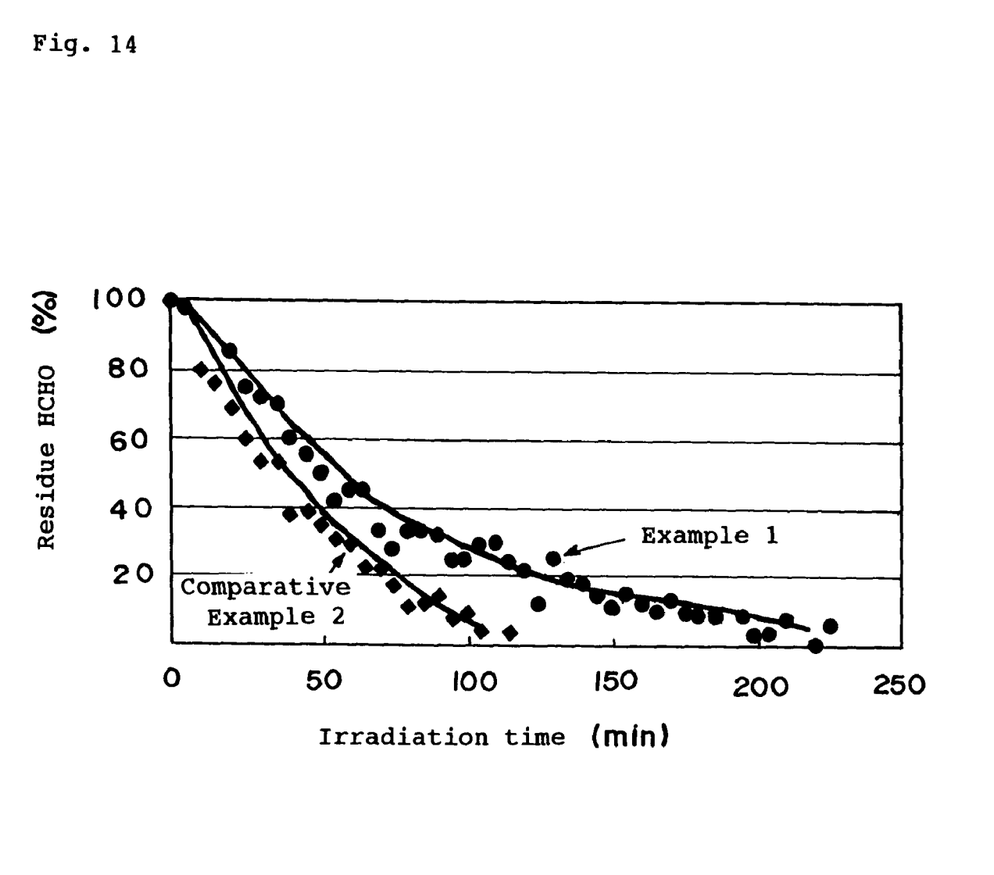
FIG. 14 shows formaldehyde decomposition ability of the titanium dioxide fine particles in Example 1 and Comparative Example 2.

The results are shown in FIG. 14.

As shown in FIG. 14, it was confirmed that the titanium dioxide fine particles in Example 1 exhibits a more excellent aldehyde decomposition ability by irradiation with the fluorescent lamp than the titanium dioxide fine particles in Comparative Example 2.

It may be expected from these results that the titanium dioxide fine particles of the invention can be used for deodorization in the room by irradiating with the fluorescent lamp.

Example 4

Substantially spherical fine particles of the titanium dioxide material with an average particle diameter of 6 nm (50 g) were placed on a refractory tray, and the particles were heat-treated at 570° C. for 2 hours in a mixed gas atmosphere of $NH_3$ gas and propane gas to prepare the titanium dioxide fine particles.

The concentration of the propane gas relative to the $NH_3$ gas was changed to evaluate the photocatalytic activity induced by visible light irradiation (1 hour) in each concentration of the propane gas. These results are shown in the graph in FIG. 7.

Figure 7:
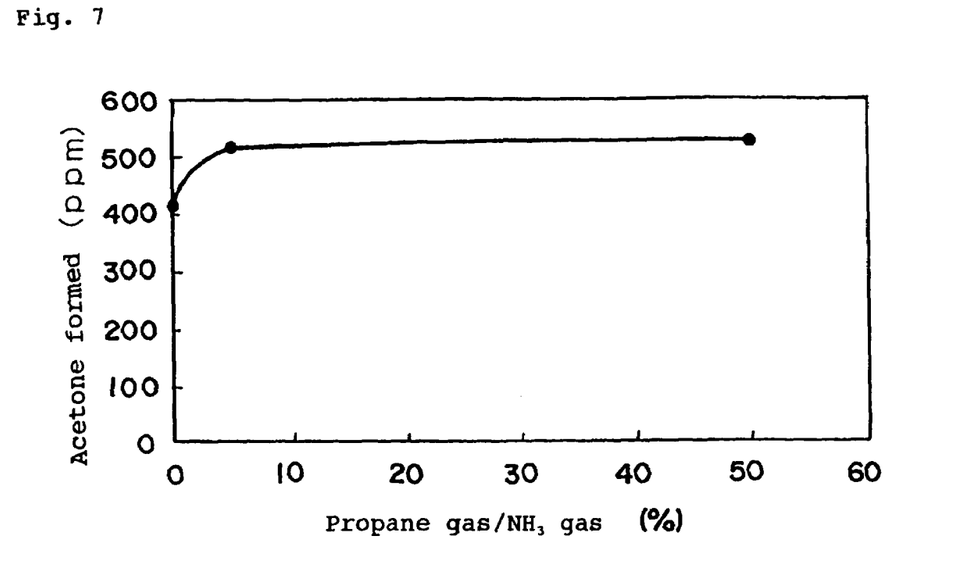
FIG. 7 is a graph showing the relation between the concentration of the propane gas in $NH_3$ gas and photocatalytic activity in Example 4.

As shown in the graph in FIG. 7, the photocatalytic activity induced by visible light irradiation was a little poor when the concentration of the propane gas was 0% relative to the $NH_3$ gas, and a sufficient effect was observed at a concentration of 2% or more. An excellent photocatalytic activity was almost constantly observed when the concentration was 5% or more.

All the titanium dioxide fine particles obtained were grown into ellipsoidal spheres with a major axis length of about 40 nm having a yellowish color.

Example 5

Substantially spherical fine particles of the titanium dioxide material with an average particle diameter of 6 nm (50 g) were placed on a refractory tray, and the particles were heat-treated at each temperature in the range of 500 to 630° C. for 2 hours in a mixed gas atmosphere of $NH_3$ gas and propane gas (5% relative to the $NH_3$ gas) to prepare the titanium dioxide fine particles.

The photocatalytic activity induced by visible light irradiation (1 hour) at each heat treatment temperature was evaluated. These results are shown in a graph in FIG. 8.

Figure 8:
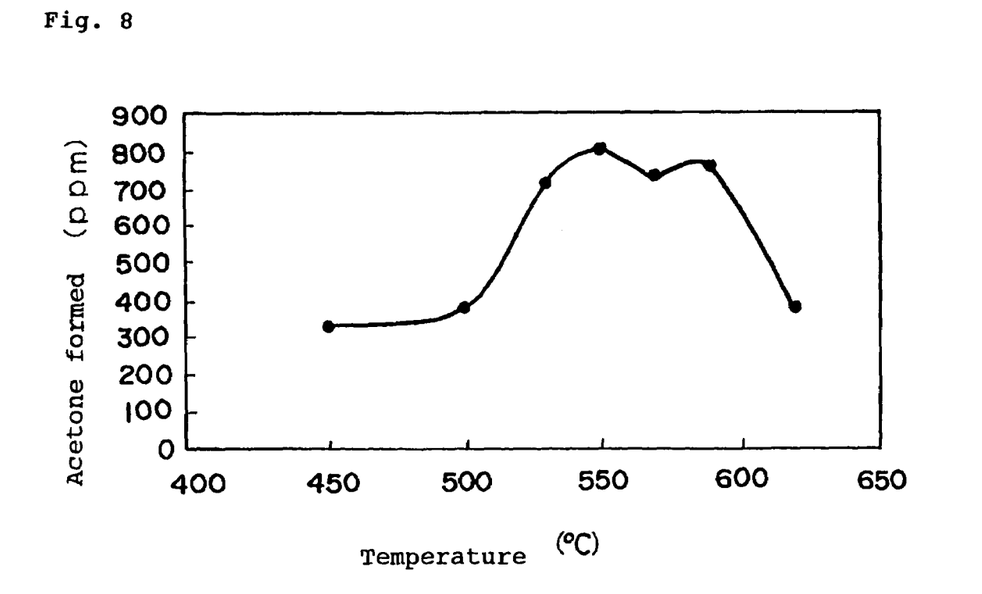
FIG. 8 is a graph showing the heat treatment temperature and photocatalytic activity in Example 5.

As shown in the graph in FIG. 8, an excellent photocatalytic activity induced by visible light irradiation was observed at a heat treatment temperature of 500° C. or more and 620° C. or less. The effects of improvements were evident particularly at a heat treatment temperature of 530° C. or more and 590° C. or less.

The titanium dioxide particles obtained by heat-treating at 540° C. was analyzed, and found that nitrogen and carbon are contained in the concentrations of 3,500 ppm by weight and 160 ppm by weight, respectively.

All the titanium dioxide fine particles obtained were grown into ellipsoidal spheres with a major axis length of 30 to 40 nm having an yellowish color.

Figure 9:
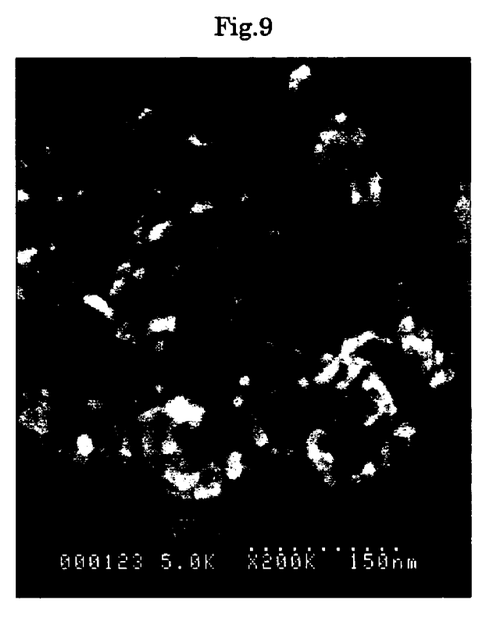
FIG. 9 is a FE-SEM photograph of the titanium dioxide fine particles obtained by a heat treatment at 500° C.
Figure 10:
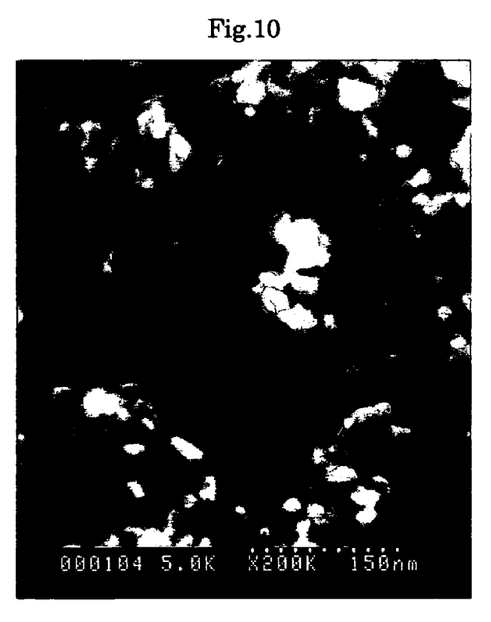
FIG. 10 is a FE-SEM photograph of the titanium dioxide fine particles obtained by a heat treatment at 570° C.
Figure 11:
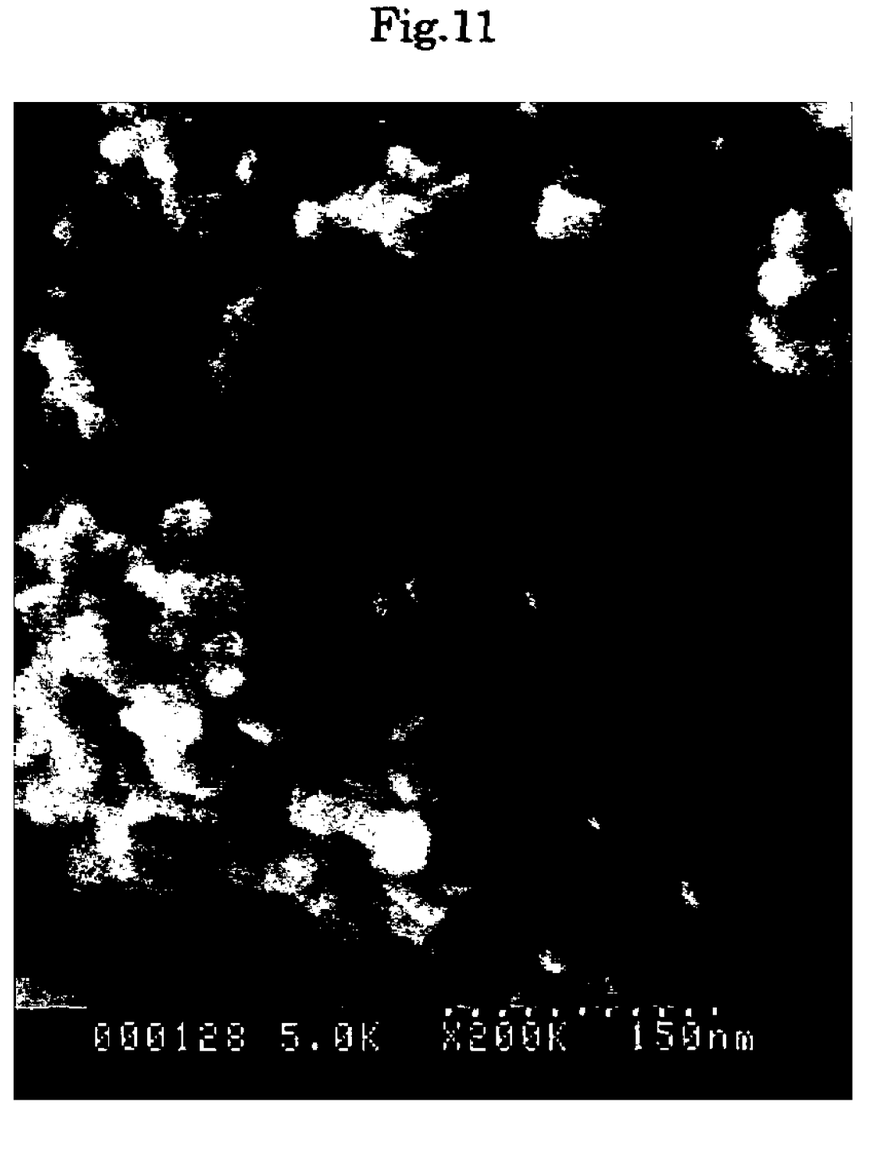
FIG. 11 is a FE-SEM photograph of the titanium dioxide fine particles obtained by a heat treatment at 620° C.

FE-SEM photographs of the titanium dioxide fine particles obtained by heat-treating at each temperature of 500° C., 570° C. and 620° C. are shown in FIGS. 9 to 11.

Example 6

Substantially spherical fine particles (50 g) of the titanium dioxide material with an average particle diameter of 6 nm were granulated into several microns of particles. A slurry of these particles was formed, and a molded body of a porous plate was prepared by cross-linking polymerization after foaming by stirring.

The molded body was heat-treated at 590° C. for 8 hours in a mixed gas atmosphere of $NH_3$ gas, $H_2$ gas (3% relative to the $NH_3$ gas) and $CO_2$ gas (3% relative to the $NH_3$ gas). A plate of a photocatalyst comprising a porous material with a void ratio of 70% and having communication holes (ventilation holes) in the entire plate was obtained.

What is claimed is:

1. Titanium dioxide fine particles, wherein the titanium dioxide is doped with at least two elements selected from the group consisting of carbon, hydrogen, nitrogen and sulfur wherein a titanium dioxide content of the titanium dioxide fine particles is 80% by weight or more and wherein, if the titanium dioxide is doped with nitrogen, the nitrogen comprises 700 ppm by weight or more.

2. A method for producing titanium dioxide fine particles according to claim 1, comprising:
   heat-treating titanium dioxide fine particles at a temperature of from 500° C. or more to 620° C. or less in an atmosphere of a nitrogen, carbon and hydrogen containing gas.

3. A method for producing titanium dioxide fine particles according to claim 1, comparising:
   heat-treating titanium dioxide fine particles at a temperature of from 500° C. or more to 620° C. or less in an atmosphere of an Nil3 gas and carbon containing gas.

4. The method for producing titanium dioxide fine particles according to claim 3, wherein the step of heat treating titanium dioxide particles comprises heat treating titanium dioxide fine particles comprising an average particle diameter of 10 nm or less and a specific surface area of 300 m$^2$/g or more.

5. Titanium dioxide fine particles, wherein the titanium dioxide is doped with 700 ppm by weight or more of nitrogen and with at least one element selected from the group consisting of carbon, hydrogen and sulfur and wherein a titanium dioxide content of the titanium dioxide fine particles is 80% by weight or more.

6. Titanium dioxide fine particles, wherein the titanium dioxide is doped with carbon, hydrogen and 700 ppm by weight or more of nitrogen and wherein a titanium dioxide content of the titanium dioxide fine particles is 80% by weight or more.

7. Titanium dioxide fine particles according to claim 5, wherein the concentration of doped nitrogen is 10,000 ppm by weight or less.

8. Titanium dioxide fine particles according to claim 5, wherein the titanium dioxide fine particles comprise doped nitrogen bonded to titanium by Ti—N—O bonds or Ti—N—Ti bonds.

9. Titanium dioxide fine particles according to claim 8, wherein the Ti—N—Ti bonds are the majority of the nitrogen-titanium bonds.

10. Titanium dioxide fine particles according to claim 5, wherein doped nitrogen desorbs as $N_2$ on heating the titanium dioxide fine particles and shows an $N_2$ desorption peak at a temperature of 700° C. or more.

11. Titanium dioxide fine particles according to claim 5, wherein doped hydrogen desorbs as $H_2$ on heating the titanium dioxide fine particles and shows an $H_2$ desorption peak at a temperature of 700° C. or more.

12. Titanium dioxide fine particles according to claim 5, wherein doped carbon desorbs as $CO_2$ on heating the titanium dioxide fine particles and shows a $CO_2$ desorption peak at a temperature of 700° C. or more.

13. Titanium dioxide fine particles according to claim 5, wherein a component having a m/e ratio between the mass number (m) and ionic charge number (e) of 68 desorbs on heating the fine particles and shows a desorption peak at a temperature of the component of 700° C. or more.

14. Titanium dioxide fine particles, wherein the titanium dioxide is doped with two or more kinds of anions including at least carbon and nitrogen wherein the titanium dioxide is doped with at least 700 ppm by weight or more of nitrogen relative to titanium oxide and wherein of the titanium dioxide fine particles is 80% by weight or more and wherein a titanium dioxide content of the titanium dioxide fine particles is 80% by weight or more.

15. Titanium dioxide fine particles according to claim 14, wherein the concentration of doped carbon is 50 ppm by weight or more relative to titanium dioxide.

16. The titanium dioxide fine particles according to claim 5, wherein the titanium dioxide particles comprise particles having a particle diameter of 1 μm or less.

17. The titanium dioxide fine particles according to claim 5, wherein titanium dioxide fine particles comprise particles having an ellipsoidal shape with a major axis length of 10 nm or more and 60 nm or less.

18. Titanium dioxide fine particles according to claim 5, wherein an IR spectrum measured by Fourier transform IR spectroscopy exhibits absorption peaks at 340±10 $cm^{-1}$ and 580±50 $cm^{-1}$.

19. Titanium dioxide fine particles according to claim 5, wherein the titanium dioxide fine particles exhibit an isopropanol oxidation activity under visible light irradiation with a wavelength of 400 nm or more and 600 nm or less.

20. Titanium dioxide fine particles according to claim 5 produced by a process comprising:
    placing 0.2 g of the titanium dioxide fine particles as a sample formed into a uniform 10 cm square layer in a gas bag with a volume of 1 liter;
    filling an isopropanol gas in the bag and adjusting an initial concentration to 1,500 ppm ±150 ppm; and
    irradiating a light from a UV-shielded fluorescent lamp to the sample at an intensity of 0.5 $W/cm^2$ at an wavelength of 420 nm for 1 hour.

21. A method of using titanium dioxide fine particles according to claim 5, comprising:
    catalyzing an oxidation reaction with the titanium dioxide fine particles by exposing the particles to visible light.

22. Titanium dioxide fine particles, wherein the titanium dioxide is doped with 700 ppm by weight or more to 10,000 ppm by weight or less of nitrogen anions and further doped with carbon anions in a concentration of 1/30 or more to 1/3 or less of the concentration of nitrogen are doped in titanium dioxide and wherein a titanium dioxide content of the titanium dioxide fine particles is 80% by weight or more.

* * * * *